US007758058B2

(12) United States Patent
Bordini

(10) Patent No.: US 7,758,058 B2
(45) Date of Patent: Jul. 20, 2010

(54) FRONT STEERABLE DEVICE FOR A VEHICLE

(75) Inventor: Giorgio Bordini, Pormigine (IT)

(73) Assignee: CNH America LLC, New Holland, PA (US)

( * ) Notice: Subject to any disclaimer, the term of this patent is extended or adjusted under 35 U.S.C. 154(b) by 487 days.

(21) Appl. No.: 11/711,198

(22) Filed: Feb. 27, 2007

(65) Prior Publication Data

US 2007/0251752 A1 Nov. 1, 2007

(51) Int. Cl.
*B62D 5/00* (2006.01)
*B62D 1/02* (2006.01)

(52) U.S. Cl. ............................... 280/137.501; 280/771

(58) Field of Classification Search .................. 280/98, 280/771, 93.504, 93.505, 93.51, 96.508, 280/137.5, 137.501; 180/53.1
See application file for complete search history.

(56) References Cited

U.S. PATENT DOCUMENTS 4,448,274 A 5/1984 van der Lely

| 5,340,138 | A | * | 8/1994 | Hurlburt | 280/93.504 |
| 7,144,022 | B2 | * | 12/2006 | Bordini | 280/124.109 |
| 2004/0080134 | A1 | * | 4/2004 | Sap et al. | 280/124.114 |

FOREIGN PATENT DOCUMENTS

| GB | 2023392 | 1/1980 |
| GB | 4409113 | 9/1995 |

* cited by examiner

*Primary Examiner*—Paul N Dickson
*Assistant Examiner*—Karen Jane J Amores
(74) *Attorney, Agent, or Firm*—Patrick M. Sheldrake; John William Stader; Michael G. Harms

(57) ABSTRACT

A motor-vehicle (AV), in particular a tractor, having a front steerable device (BL). The motor-vehicle (AV) is characterized in that the front steerable device (BL) (ballast, implement, PTO) is hinged to a chassis (FR), and in that the front steerable device (BL) is rotated by a mechanism (MC) partly integral with a rotatable front yoke (11). The mechanism (MC) is activated by rotation of the front yoke (11).

9 Claims, 5 Drawing Sheets

FRONT STEERABLE DEVICE FOR A VEHICLE

FIELD OF THE INVENTION

The present invention relates to a motor-vehicle, in particular a tractor, provided with a front steerable device.

BACKGROUND OF THE INVENTION

In the tractor manufacturing industry, a front axle is known, in which, in addition to the front wheels steering the vehicle, the axle itself performs a relative roto-lateral movement with respect to the chassis to improve steering performance. A certain amount of vertical movement of the front wheels must also be allowed to adapt to rough ground.

Though a big improvement with respect to conventional systems, currently used steering systems employing relative lateral movements with respect to the chassis pose the problem of the wheels, at certain wheel tilt angles, colliding with the front of the tractor. Moreover, many currently used tractors, particularly so-called "supersteer" types, have no front suspensions. In this type of vehicle, the front axle has fork members for supporting a front ballast, or a front implement, or a front power take-off (PTO). In these applications, when turning, all the mechanical devices (front ballast, front implement, PTO, etc.) are turned together with the front axle and so prevented from interfering with the front wheels.

However, to fit a tractor with front suspensions, e.g. to increase operating speed and adapt to rough ground, the front mechanical devices must be mounted directly on the chassis, as opposed to the front axle, thus resulting in interference between the front wheels and the front mechanical devices when turning. In other words, in motor-vehicles with suspensions, the front devices (ballast, front implement, front PTO, etc.) can no longer be mounted on the front axle. In fact, the front axle being equipped with suspensions, the front devices, if they were to weigh directly on the front axle, would necessarily have to follow the contour of the terrain, thus at least partly forfeiting the advantages for which a front suspension system is provided in the first place. In motor-vehicles with front suspension systems, therefore, the front devices must be mounted directly on the chassis, as opposed to the front axle.

It should be stressed, therefore, that, though the present invention applies in particular to motor-vehicles with front suspensions, the teachings of the invention also apply to advantage to motor-vehicles with no front suspensions.

SUMMARY OF THE INVENTION

It is a main object of the present invention, therefore, to prevent any interference between the front wheels and front devices (ballast, PTO, etc.) of motor-vehicles both with and without front suspensions.

According to the present invention, there is provided a motor-vehicle, in particular a tractor, having a front steerable device, as claimed in the accompanying Claims.

DESCRIPTION OF THE DRAWINGS

A non-limiting embodiment of the present invention will be described by way of example with reference to the accompanying drawings, in which.

DETAILED DESCRIPTION OF THE EXEMPLARY EMBODIMENTS

Figure 1:
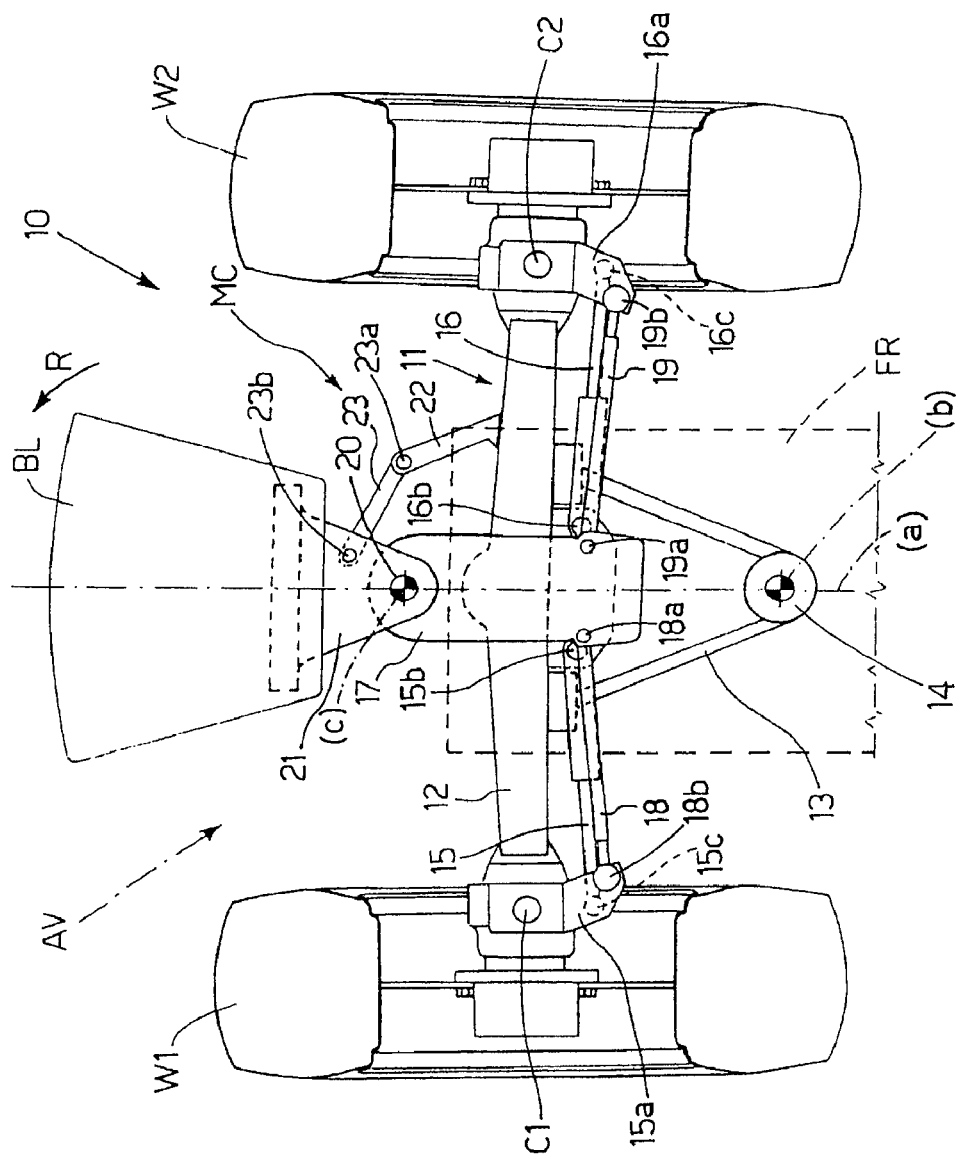
FIG. 1 shows a plan view of a first configuration of the front of a first embodiment of a motor-vehicle having a front steerable device, in accordance with the present invention.

Number 10 in the accompanying drawings indicates the front of a motor-vehicle AV (shown only partly) having a chassis FR. Front 10 comprises, in a known manner, a front yoke 11 comprising two front wheels W1, W2 on opposite sides of a centerline (a) of chassis FR.

Front yoke 11 in turn also comprises a rigid front axle 12 connected mechanically to the two wheels W1, W2; and a supporting structure 13 hinged to chassis FR by a hinge 14, which has a vertical axis (b) (perpendicular to axis (a)) and, possibly, a spherical or universal joint (not shown in the accompanying drawings). When turning, transverse slide of front yoke 11 is guided by an arc-shaped guide (not shown, and of the type described, for example, in EP 0 597 515).

Each wheel W1, W2 is connected mechanically to front axle 12 by a respective substantially vertical-axis hinge C1, C2. In known manner, front 10 also comprises two hydraulic cylinders 15, 16. Each hydraulic cylinder 15, 16 is interconnected to front axle 12 and to a respective wheel W1, W2 by a respective steering arm 15a, 16a.

Figure 2:
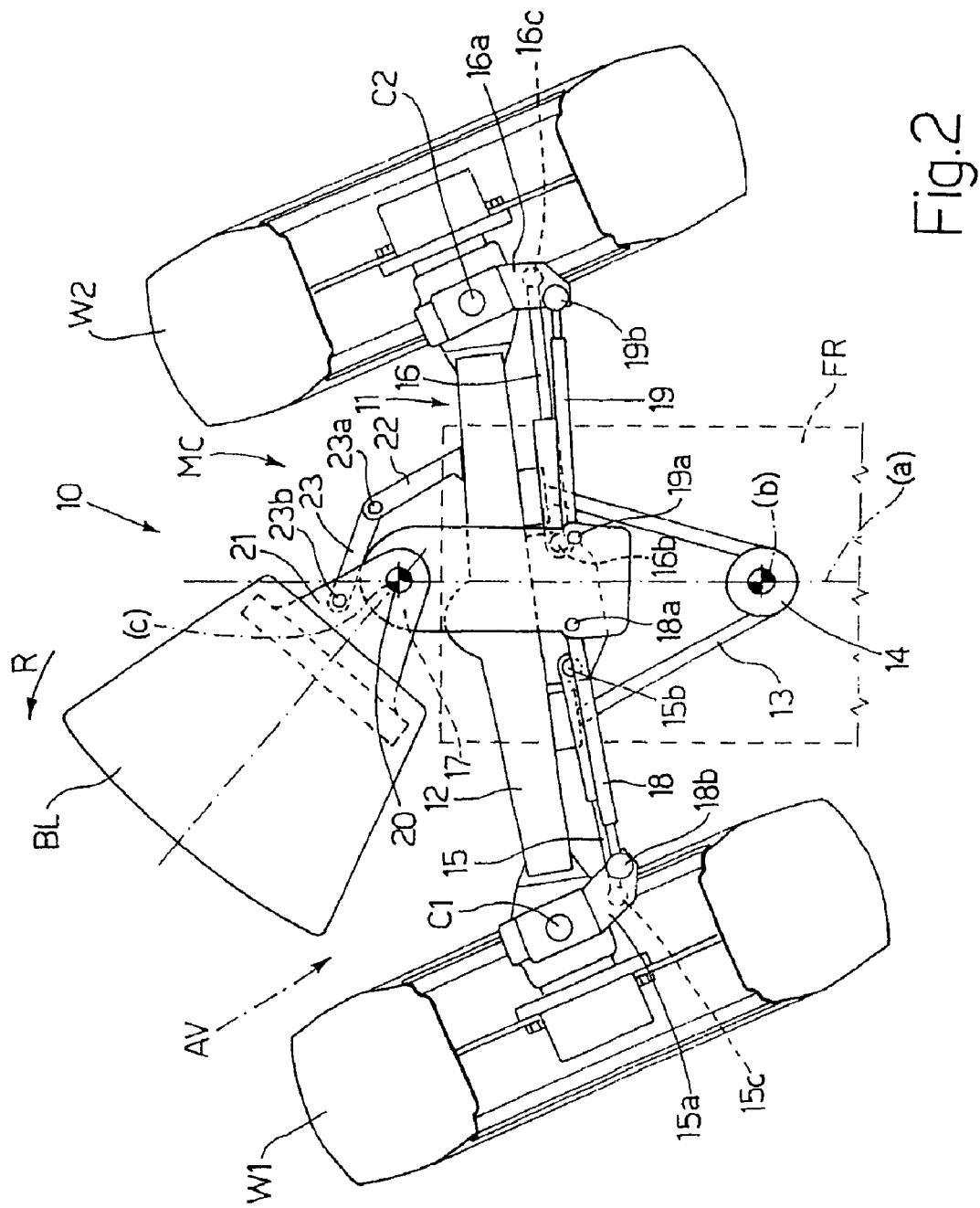
FIG. 2 shows a plan view of a second configuration of the first embodiment in FIG. 1.

As shown in FIGS. 1 and 2, hydraulic cylinder 15 is hinged to front yoke 11 by a hinge 15b, and to respective steering arm 15a by a hinge 15c. Similarly, hydraulic cylinder 16 is hinged to front yoke 11 by a hinge 16b, and to respective steering arm 16a by a hinge 16c. As shown in the accompanying drawings, a projecting member 17 is integral with and projects frontwards of chassis FR. Two articulated rods 18, 19 are hinged in known manner to projecting member 17 by respective hinges 18a, 19a. Articulated rod 18 is hinged to steering arm 15a by a hinge 18b. Similarly, articulated rod 19 is hinged to steering arm 16a by a hinge 19b. The lengths of articulated rods 18, 19 remain unchanged when turning wheels W1, W2 of motor-vehicle AV in either direction. Articulated rods 18, 19 transmit the coordinated turning movement from one to the other of wheels W1, W2 with respect to chassis FR, and at the same time produce the transverse sliding movement of chassis FR with respect to front axle 12.

Figure 3:
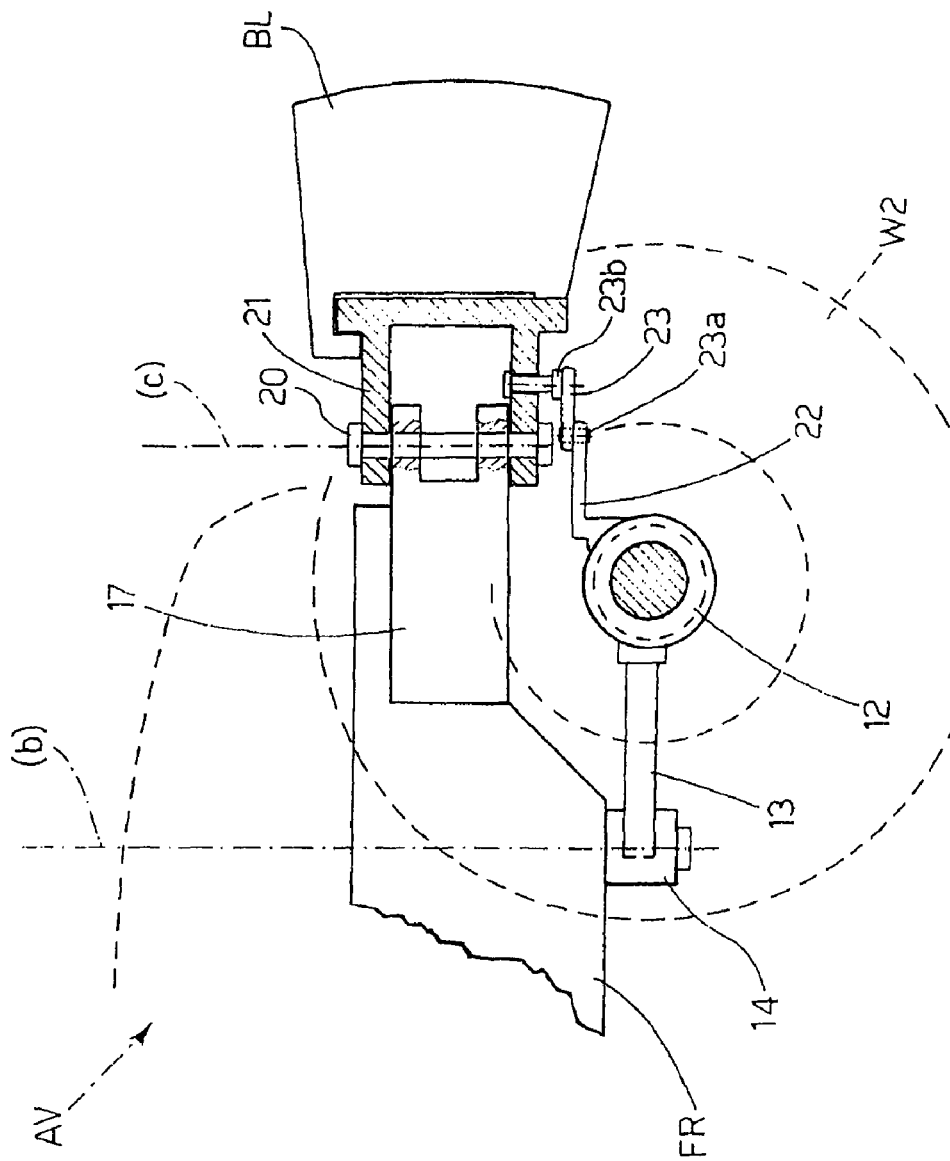
FIG. 3 shows a partly sectioned side view of the first embodiment in FIGS. 1 and 2.

As shown in more detail in FIG. 3, a support 21, supporting a front ballast BL, is connected to projecting member 17 by a hinge 20 having a vertical axis (c). Front ballast BL may, obviously, be replaced with an implement, implement attachment, PTO, etc. It should also be pointed out that, projecting member 17 being integral with chassis FR, hinge 20 is fixed with respect to chassis FR.

As shown in FIGS. 1-3, one branch of front axle 12 has an arm 22 integral with such front axle 12 and projecting towards ballast BL. A connecting rod 23 is hinged to arm 22 by a hinge 23a, and is hinged to support 21 of ballast BL by a hinge 23b. Arm 22, connecting rod 23, and relative hinges 23a, 23b constitute an actuating mechanism MC.

As shown by the configurations assumed by front 10 in FIGS. 1 and 2, leftward rotation of front yoke 11 as indicated by arrow R causes support 21 and ballast BL to also rotate in the same direction as arrow R. Leftward rotation of ballast BL is obviously caused by arm 22, integral with axle 12, acting on connecting rod 23, thus preventing any interference of wheels W1, W2 with ballast BL or with support 21 when turning. The same also applies to rightward rotation (not shown) of front yoke 11.

As will be clear to anyone skilled in the art, the particular actuating mechanism MC shown in the drawings may easily be replaced with any known mechanism for rotating support 21 alongside rotation of yoke 11. The same also applies when turning right (not shown).

Figure 4:
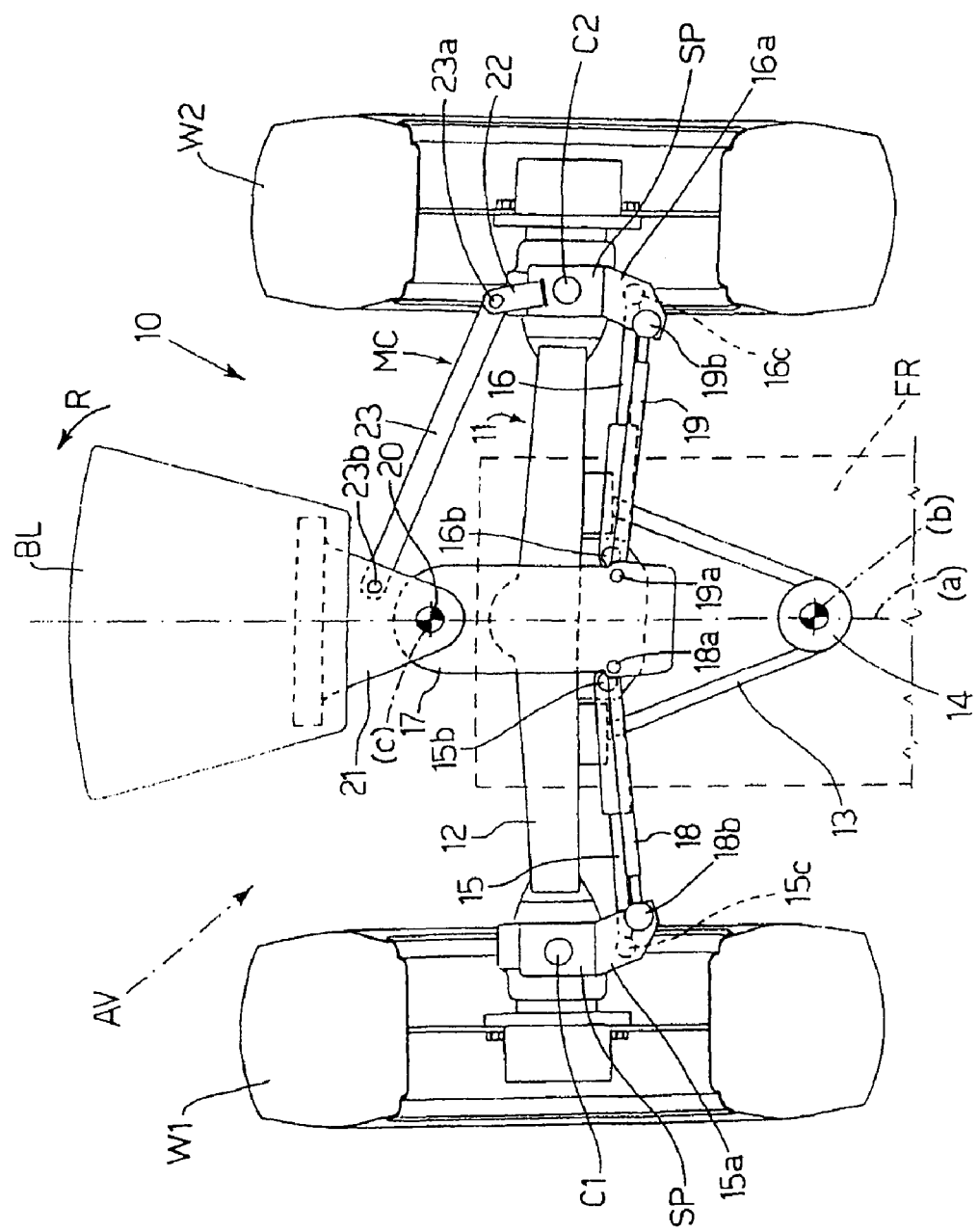
FIG. 4 shows a plan view of a first configuration of the front of a second embodiment of a motor-vehicle having a front steerable device, in accordance with the present invention.
Figure 5:
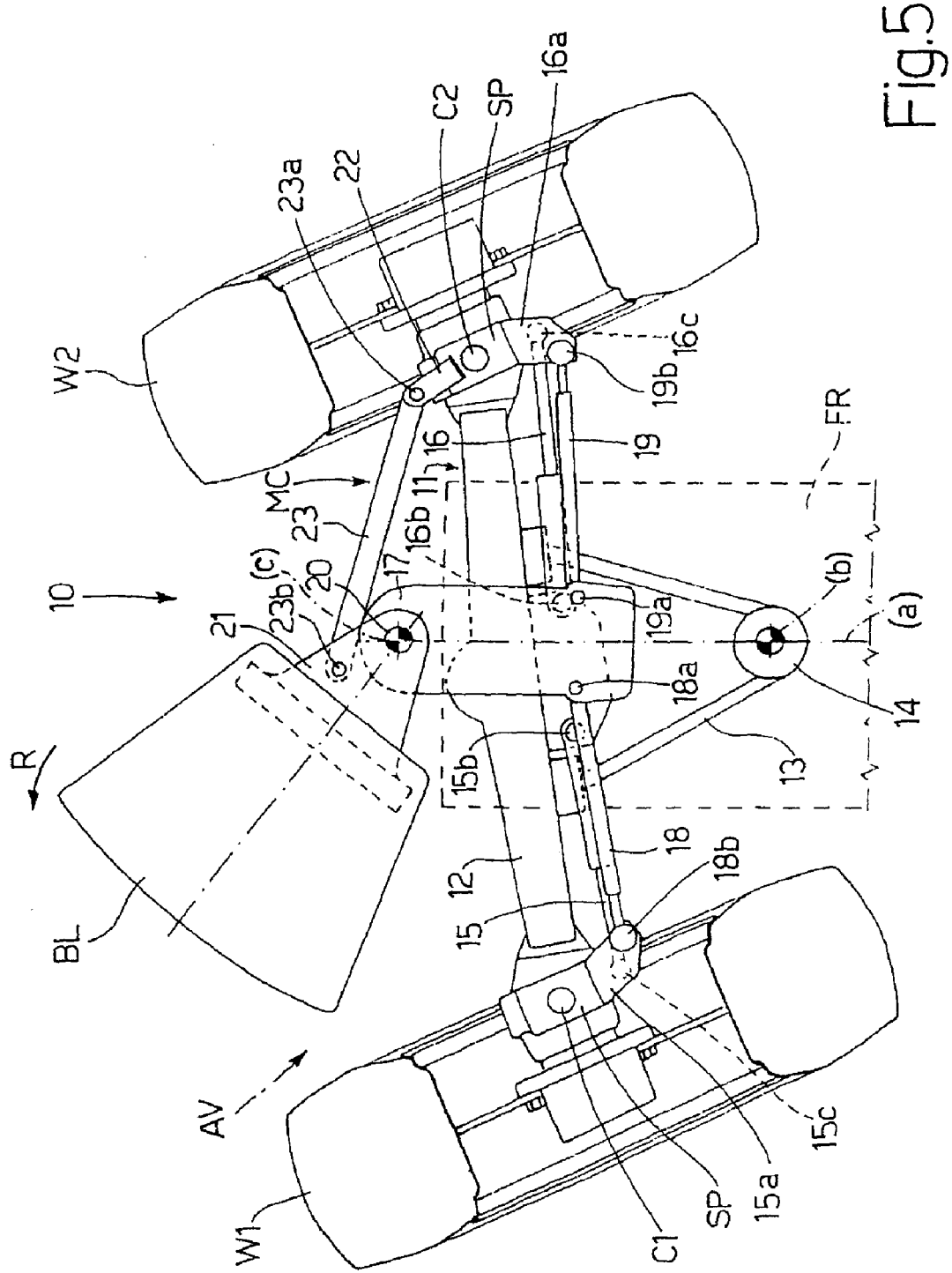
FIG. 5 shows a plan view of a second configuration of the second embodiment in FIG. 4.

For the system described above to operate, arm 22 may obviously be integral with any portion of yoke 11. In fact, as shown in FIGS. 4 and 5, as opposed to being integral with axle 12 (as shown in the first embodiment in FIGS. 1-3), arm 22 may be integral with an articulated support SP of wheel W2 (or, indifferently, of wheel W1, in an embodiment not shown) without departing from the scope of the present invention.

The action of arm 22 on connecting rod 23 (and therefore on support 21 and ballast BL) has exactly the same effect as described with reference to the FIG. 1-3 embodiment.

As will be clear to anyone skilled in the art, though the above description refers to a motor-vehicle in which the front axle moves laterally when turning, the same teachings also apply to motor-vehicles in which the front axle does not rotate-translate with respect to the chassis, and in which overall turning of the motor-vehicle is achieved solely by turning the front wheels.

The present invention also applies to motor-vehicles with powered front axles. The present invention also applies to the following vehicle configurations:
1. front yoke with or without power drive, with or without suspension;
2. front yoke, with or without lateral movement, i.e. normal steering and supersteering, and with or without suspensions;
3. front yoke, according to the above described configurations at points 1 and 2, with or without front PTO; and
4. front yoke with any combination of the embodiments according to points 1, 2, 3.

Some advantages of the motor-vehicle with a front steerable device according to the present invention can be summed up as follows:
no interference whatsoever between the front wheels and any portion of the front yoke and/or chassis;
improved stability of the motor-vehicle, by virtue of the ballast (or implement, PTO, etc.) moving towards the centre of curvature of the front wheels when turning.

What is claimed is:

1. A motor vehicle having a front steerable device, the motor vehicle comprising:
a chassis cover with a vehicle body,
an engine assembly inside the vehicle body,
a rotatable front yoke having a rigid front axle connected mechanically to two wheels,
a device for steering the motor-vehicle, and
a front steerable device hinged to a projecting member fixed to and extending forwardly of the chassis, the steerable device is connected to the projecting member by a rotatable connection having a first vertical axis;
wherein the front steerable device is rotated by a mechanism partly integral with the rotatable front yoke, the rotatable front yoke further comprising a supporting structure connected to the chassis by a hinge, the hinge permitting rotation of the rotatable front yoke around a second vertical axis, the front steerable device being rotated by a mechanism partly integral with the rotatable front yoke and the mechanism configured to rotate the front steerable device upon rotation of the rotatable front yoke around the second vertical axis; and
wherein the mechanism comprises a connecting rod connecting to a support of the front steerable device that is rotatably mounted to a front portion of the vehicle forward of the rotatable front yoke, respectively the mechanism configured for rotating the steerable device about the first vertical axis for rotation with respect to the chassis upon movement of the rotatable front yoke.

2. A motor-vehicle as claimed in claim 1, wherein the mechanism is partly integral with a front axle.

3. A motor-vehicle as claimed in claim 1, wherein the mechanism is partly integral with an articulated support of one wheel.

4. A motor vehicle as claimed in claim 1, wherein the mechanism comprises an arm directly connected to the yoke, the connecting rod, and relative hinges for hinging the connecting rod to the arm and the support.

5. A motor vehicle as claimed in claim 1, wherein the rotatable front yoke is a front yoke with a power drive, and with front axle mounted suspensions.

6. A motor vehicle as claimed in claim 1, wherein the rotatable front yoke is a front yoke with lateral movements, i.e. supersteering, and front suspensions.

7. A motor vehicle as claimed in claim 5, wherein a front power take-off is mounted to the steerable device.

8. A motor vehicle as claimed in claim 6, a front power take-off is mounted to the steerable device.

9. A motor vehicle as claimed in claim 1, wherein the motor vehicle is a tractor and the steerable device includes a removable ballast.

* * * * *